(12) United States Patent
Kano et al.

(10) Patent No.: US 11,989,479 B2
(45) Date of Patent: May 21, 2024

(54) ELECTRONIC DEVICE

(71) Applicant: Murata Manufacturing Co., Ltd., Nagaokakyo (JP)

(72) Inventors: Hidekazu Kano, Nagaokakyo (JP); Yoshihiko Nishizawa, Nagaokakyo (JP); Kentaro Usui, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/835,607

(22) Filed: Jun. 8, 2022

(65) Prior Publication Data
US 2022/0300237 A1 Sep. 22, 2022

Related U.S. Application Data

(63) Continuation of application No. PCT/JP2021/025971, filed on Jul. 9, 2021.

(30) Foreign Application Priority Data

Jul. 30, 2020 (JP) ................................. 2020-128894

(51) Int. Cl.
*G06F 3/14* (2006.01)
*G06F 1/16* (2006.01)
(Continued)

(52) U.S. Cl.
CPC .......... *G06F 3/1446* (2013.01); *G06F 1/1641* (2013.01); *G06F 1/1647* (2013.01);
(Continued)

(58) Field of Classification Search
CPC ................... G06F 9/451; G06F 1/1641; G06F 2200/1614; G06F 1/1677; G06F 1/1652;
(Continued)

(56) References Cited

U.S. PATENT DOCUMENTS

2010/0011291 A1* 1/2010 Nurmi ................... G06F 1/1652
715/702
2012/0081267 A1 4/2012 Sirpal et al.
(Continued)

FOREIGN PATENT DOCUMENTS

CN 110045936 A 7/2019
CN 110401768 A 11/2019
(Continued)

OTHER PUBLICATIONS

International Search Report in PCT/JP2021/025971, dated Sep. 14, 2021, 3 pages.

*Primary Examiner* — Dismery Mercedes
(74) *Attorney, Agent, or Firm* — ArentFox Schiff LLP

(57) ABSTRACT

An electronic device is provided that includes a first display unit including a first display; a second display unit including a second display disposed on a side of the first display and being rotatable with respect to the first display unit about a rotation axis extending in a front-rear direction such that an angle formed by the first and displays change; an angle and angular velocity acquisition unit that acquires the angle formed by the first and second displays and angular velocity of the angle; and a control unit that, when a user rotates the second display unit with respect to the first display unit, determines whether a horizontal direction of a video to be displayed on the first and second displays is made to match a vertical direction or a left-right direction based on the angle and the angular velocity acquired by the acquisition unit.

20 Claims, 9 Drawing Sheets

(51) Int. Cl.
*G09G 3/00* (2006.01)
*G09G 3/3208* (2016.01)

(52) U.S. Cl.
CPC .......... G06F 1/1652 (2013.01); G06F 1/1677 (2013.01); *G06F 2203/04102* (2013.01); *G09G 3/035* (2020.08); *G09G 3/3208* (2013.01); *G09G 2340/0478* (2013.01); *G09G 2340/0492* (2013.01)

(58) Field of Classification Search
CPC ......... G06F 2203/04102; G06F 3/1446; G06F 3/04845; G09G 2380/02; G09G 3/035; G09G 3/003; G09G 2300/026; G06T 3/40
See application file for complete search history.

(56) References Cited

U.S. PATENT DOCUMENTS

| | | | |
|---|---|---|---|
| 2012/0081270 A1 | 4/2012 | Gimpl et al. | |
| 2012/0326971 A1* | 12/2012 | Zhou | G09G 5/00 345/156 |
| 2013/0205142 A1* | 8/2013 | Jung | G06F 1/1677 713/300 |
| 2015/0153778 A1* | 6/2015 | Jung | G06F 1/1677 345/156 |
| 2015/0220119 A1* | 8/2015 | Seo | G09G 5/37 345/173 |
| 2016/0034047 A1* | 2/2016 | Lee | H04M 1/72427 345/156 |
| 2016/0179236 A1 | 6/2016 | Shin et al. | |
| 2016/0187994 A1* | 6/2016 | La | G06F 3/147 345/619 |
| 2016/0259514 A1* | 9/2016 | Sang | G06F 3/0487 |
| 2017/0075640 A1* | 3/2017 | Chun | G06F 3/1423 |
| 2017/0357292 A1* | 12/2017 | Cho | H04M 1/0216 |
| 2018/0031370 A1* | 2/2018 | Pan | G06F 1/1694 |
| 2018/0342226 A1 | 11/2018 | Shin et al. | |
| 2020/0073446 A1* | 3/2020 | Wu | G06V 40/13 |
| 2021/0041912 A1* | 2/2021 | Eom | H04M 1/0216 |
| 2021/0247805 A1* | 8/2021 | Min | H04M 1/0243 |
| 2021/0360099 A1* | 11/2021 | You | H03K 17/964 |
| 2022/0044607 A1* | 2/2022 | Kim | G06F 1/3287 |
| 2022/0214852 A1* | 7/2022 | Kim | G09F 9/30 |
| 2022/0261093 A1* | 8/2022 | Zhang | G06F 1/1652 |
| 2022/0360654 A1* | 11/2022 | Xiong | H04M 1/72436 |

FOREIGN PATENT DOCUMENTS

| | | |
|---|---|---|
| JP | 2003302957 A | 10/2003 |
| JP | 2009222951 A | 10/2009 |
| JP | 2009265757 A | 11/2009 |
| JP | 2010175999 A | 8/2010 |
| JP | 2013546044 A | 12/2013 |

* cited by examiner

ELECTRONIC DEVICE

CROSS REFERENCE TO RELATED APPLICATIONS

This application is a continuation of PCT Application No. PCT/JP2021/025971, filed Jul. 9, 2021, which claims priority to Japanese Patent Application No. 2020-128894, filed Jul. 30, 2020, the entire contents of each of which are hereby incorporated in their entirety.

TECHNICAL FIELD

The present invention relates to a foldable electronic device.

BACKGROUND

An example of a conventional mobile terminal is described in U.S. Patent Publication No. 2016/0179236 A (hereinafter "Patent Document 1"). As described in Patent Document 1, in a mobile terminal including a bendable flexible display unit, it may be difficult for a user to operate a touch panel in a state where the flexible display unit is bent. Thus, the mobile terminal includes a flexible display unit, a sensing unit, and a controller, with the flexible display unit having a bendable structure. The sensing unit senses an angle at which the flexible display unit is bent. The controller changes transparency of a portion of the flexible display unit based on the angle sensed by the sensing unit. As described above, in the mobile terminal described in Patent Document 1, a display state of the flexible display unit is changed based on the angle at which the flexible display unit is bent.

In the mobile terminal described in Patent Document 1, the flexible display unit has a bendable structure. Thus, there are many types of use scenes of mobile terminals. However, a user of the mobile terminal desires that a video having an orientation suitable for a use scene is displayed on the flexible display unit.

SUMMARY OF THE INVENTION

Thus, it is an object of the present invention to provide an electronic device including a foldable first display and a foldable second display. In this aspect, the electronic device is configured to display a video and has an orientation suitable for a use scene.

In an exemplary embodiment, an electronic device is provided that includes a first display unit including a first display; a second display unit including a second display disposed on a side of the first display, with the second display unit being rotatable with respect to the first display unit about a rotation axis extending in a front-rear direction such that an angle formed by the first display and the second display changes. Moreover, the electronic device includes an angle and angular velocity acquisition unit configured to acquire the angle formed by the first display and the second display and angular velocity of the angle; and a control unit configured to, when a user rotates the second display unit with respect to the first display unit, determine whether a horizontal direction of a video to be displayed on the first display and the second display is made to match a vertical direction or a left-right direction based on the angle and the angular velocity acquired by the angle and angular velocity acquisition unit.

According to the exemplary embodiment, an electronic device is provided that includes a foldable first display and a foldable second display, such that a video can be displayed having an orientation suitable for a use scene.

DETAILED DESCRIPTION

Exemplary Embodiment

[Configuration of Electronic Device]

Figure 1:
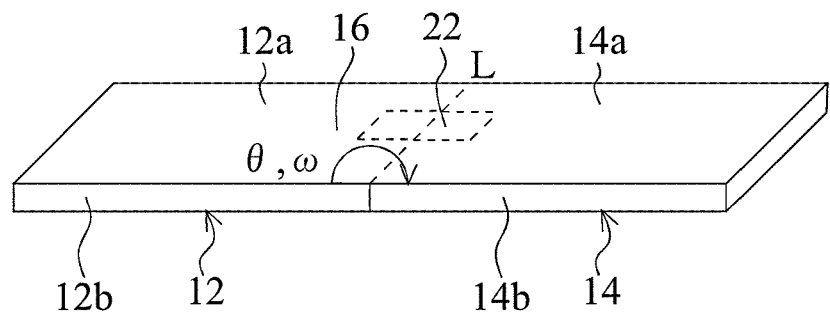
FIG. 1 is a perspective view of an electronic device 10 according to an exemplary embodiment.
Figure 1:
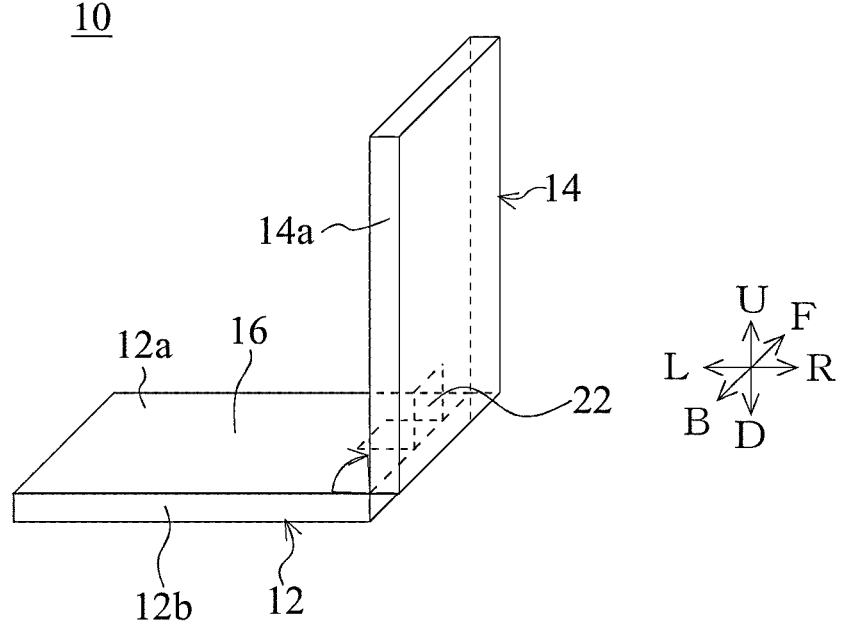
Figure 2:
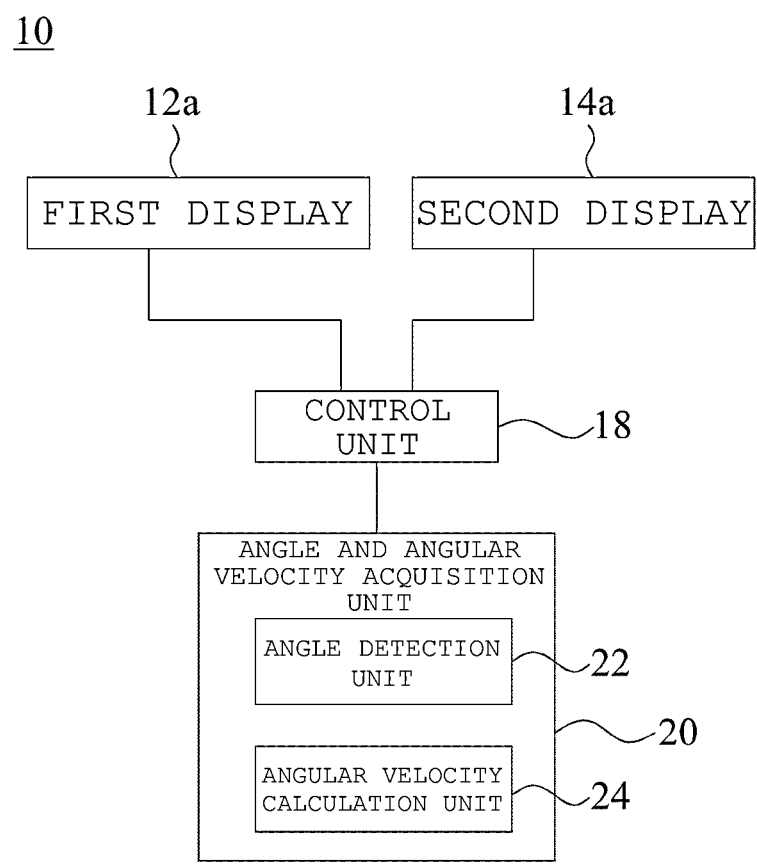
FIG. 2 is a block diagram of the electronic device 10 according to an exemplary embodiment.

A configuration of an electronic device according to an exemplary embodiment will be described below with reference to the drawings. FIG. 1 is a perspective view of an electronic device 10. FIG. 2 is a block diagram of the electronic device 10.

In the following description, a thickness direction of the electronic device 10 is defined as a vertical direction. When viewed downward, a direction in which a folding line L of the electronic device 10 extends is defined as a front-rear direction. When viewed downward, a direction orthogonal to the folding line L of the electronic device 10 is defined as a left-right direction. The vertical direction, the left-right direction, and the front-rear direction are orthogonal to each other in the exemplary aspect. In addition, it is noted that the vertical direction, the left-right direction, and the front-rear direction in the present disclosure do not have to match the vertical direction, the left-right direction, and the front-rear direction when the electronic device 10 is used.

As illustrated in FIG. 1, the electronic device 10 is a foldable smartphone. Moreover, as illustrated in FIGS. 1 and 2, the electronic device 10 includes a first display unit 12, a second display unit 14, a touch sensor 16, a control unit 18, and an angle and angular velocity acquisition unit 20.

As shown, the first display unit 12 includes a first display 12a and a first display unit main body 12b. In operation, the first display 12a is configured to display a video (or image or sequence of images) for the user. The first display unit main body 12b includes a housing, a circuit board, a battery, a central processing unit (CPU), and the like. The housing of the first display unit main body 12b holds the first display 12a and incorporates the circuit board, the battery, and the CPU. The first display unit main body 12b has a general structure, and thus, description thereof will be omitted.

The second display unit 14 is disposed on a right side (although it is simply disposed on an opposing side of a folding line L as discussed below) of the first display unit 12. The second display unit 14 is connected to the first display unit 12. The second display unit 14 includes a second display 14a and a second display unit main body 14b. The second display 14a displays a video (or image or sequence of images) for the user. The second display 14a is disposed on a right side of the first display 12a. The second display unit main body 14b includes a housing, a circuit board, a battery, a CPU, and the like. The housing of the second display unit main body 14b holds the second display 14a. The housing of the second display unit main body 14b incorporates the circuit board, the battery, and the CPU. The second display unit main body 14b has a general structure, and thus, description thereof will be omitted.

The first display 12a and the second display 14a are collectively considered one flexible display. The first display 12a and the second display 14a are implemented by, for example, an organic EL display. The second display unit 14 can rotate with respect to the first display unit 12 about a rotation axis extending in the front-rear direction such that an angle θ formed by the first display 12a and the second display 14a changes. Specifically, a folding line L extends in the front-rear direction (e.g., a width direction of the device 10). In this exemplary aspect, the first display 12a is disposed on a left side of the folding line L and the second display 14a is disposed on a right side of the folding line L. Thus, the second display unit 14 can rotate (e.g., fold) about the folding line L with respect to the first display unit 12. As a result, the electronic device 10 can take a fully open state and a fully closed state. The fully open state is a state in which the first display 12a and the second display 14a form one plane (i.e., they are in the same plane). The fully closed state is a state in which the first display 12a faces the second display 14a. The angle θ is 0° in the fully closed state. The angle θ is 180° in the fully open state.

The touch sensor 16 is provided on the first display 12a and/or the second display 14a. In the present embodiment, the touch sensor 16 is provided on the first display 12a and the second display 14a. The touch sensor 16 covers the whole surface of the first display 12a and the whole surface of the second display 14a. The touch sensor 16 is an input unit that detects a position where a user's finger touches the touch sensor 16. In an exemplary aspect, the touch sensor 16 is, for example, a capacitive touch sensor. However, the touch sensor 16 may be a resistance film type touch sensor in another exemplary aspect. The touch sensor 16 has a general structure, and thus, detailed description of the touch sensor 16 will be omitted.

The angle and angular velocity acquisition unit 20 acquires an angle θ formed by the first display 12a and the second display 14a and angular velocity ω of the angle θ. The angle and angular velocity acquisition unit 20 includes an angle detection unit 22 that detects the angle θ, and an angular velocity calculation unit 24 that calculates the angular velocity ω based on the angle θ. The angle detection unit 22 is implemented by, for example, a combination of a sensor, such as a rotary encoder, a strain sensor and a piezoelectric film sensor, and a CPU of the electronic device 10. The CPU of the angle detection unit 22 is configured to calculate the angle θ based on an electric signal output from the sensor. As illustrated in FIG. 1, the sensor of the angle detection unit 22 is provided across a lower surface of the first display 12a and a lower surface of the second display 14a. The angular velocity calculation unit 24 is implemented by, for example, a CPU of the electronic device 10. The CPU of the angular velocity calculation unit 24 acquires the angular velocity ω by differentiating the angle θ with respect to time.

When the user rotates the second display unit 14 with respect to the first display unit 12, the control unit 18 is configured to dynamically determine an orientation of a video to be displayed on the first display 12a and the second display 14a based on the angle θ and the angular velocity ω acquired by the angle and angular velocity acquisition unit 20. In other words, when the user rotates the second display unit 14 with respect to the first display unit 12, the control unit 18 determines whether a horizontal direction of the video (e.g., a display orientation) to be displayed on the first display 12a and the second display 14a is made to match the vertical direction or the left-right direction based on the angle θ and the angular velocity ω acquired by the angle and angular velocity acquisition unit 20. In the present embodiment, when the angle θ is within a predetermined range and the angular velocity ω is greater than 0 and equal to or less than a positive predetermined value, the control unit 18 is configured to determine that the horizontal direction of the video matches the front-rear direction. Furthermore, when the angle θ is not within the predetermined range or the angular velocity ω is not greater than 0 and not equal to or less than the positive predetermined value, the control unit 18 is configured to determine that the horizontal direction of the video matches the left-right direction. The control unit 18 is implemented by, for example, a CPU of the electronic device 10.

[Operation of Electronic Device]

Figure 3:
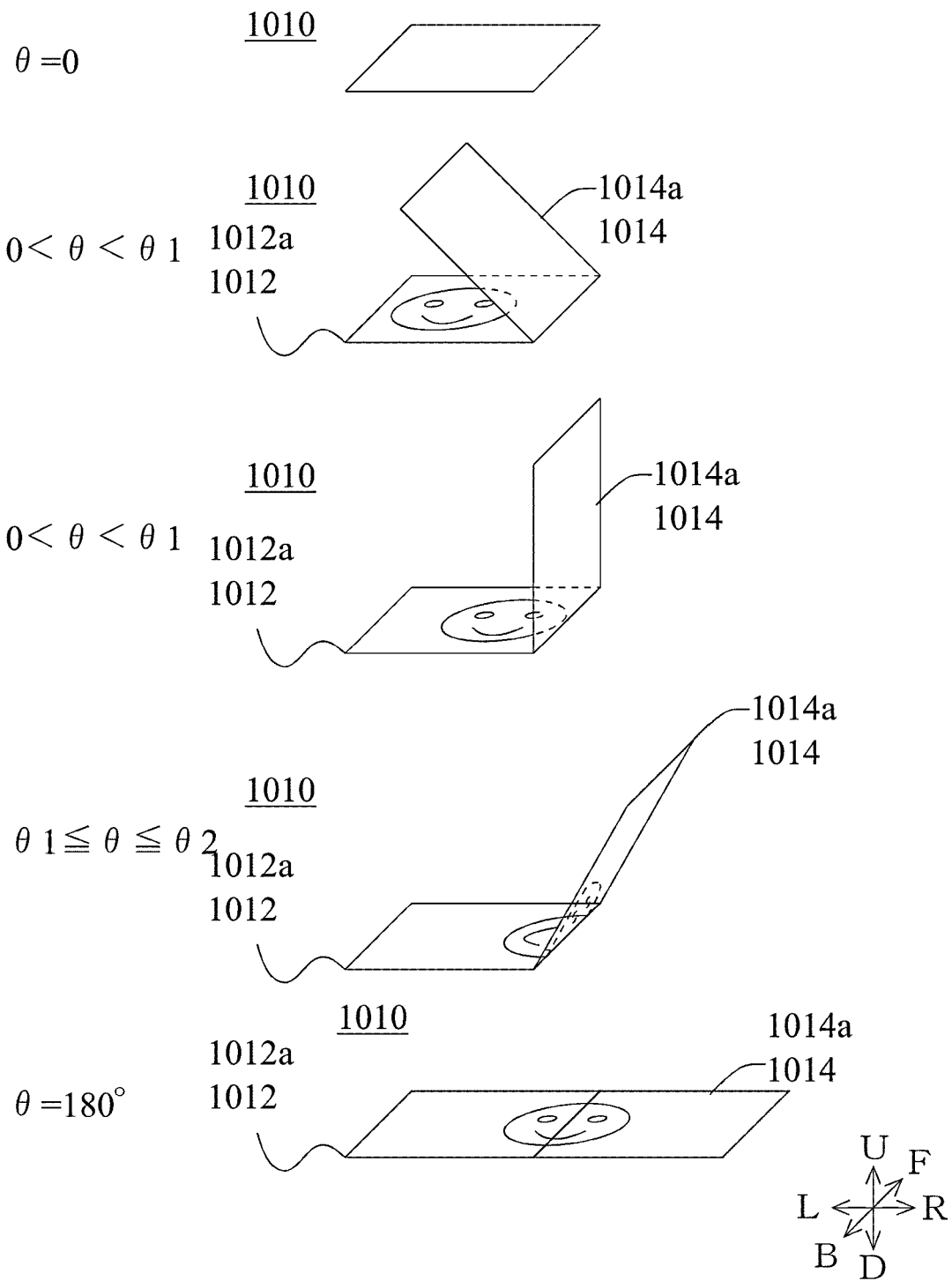
FIG. 3 is a view illustrating a video to be displayed when a state of an electronic device 1010 in related art is switched from a fully closed state to a fully open state.
Figure 4:
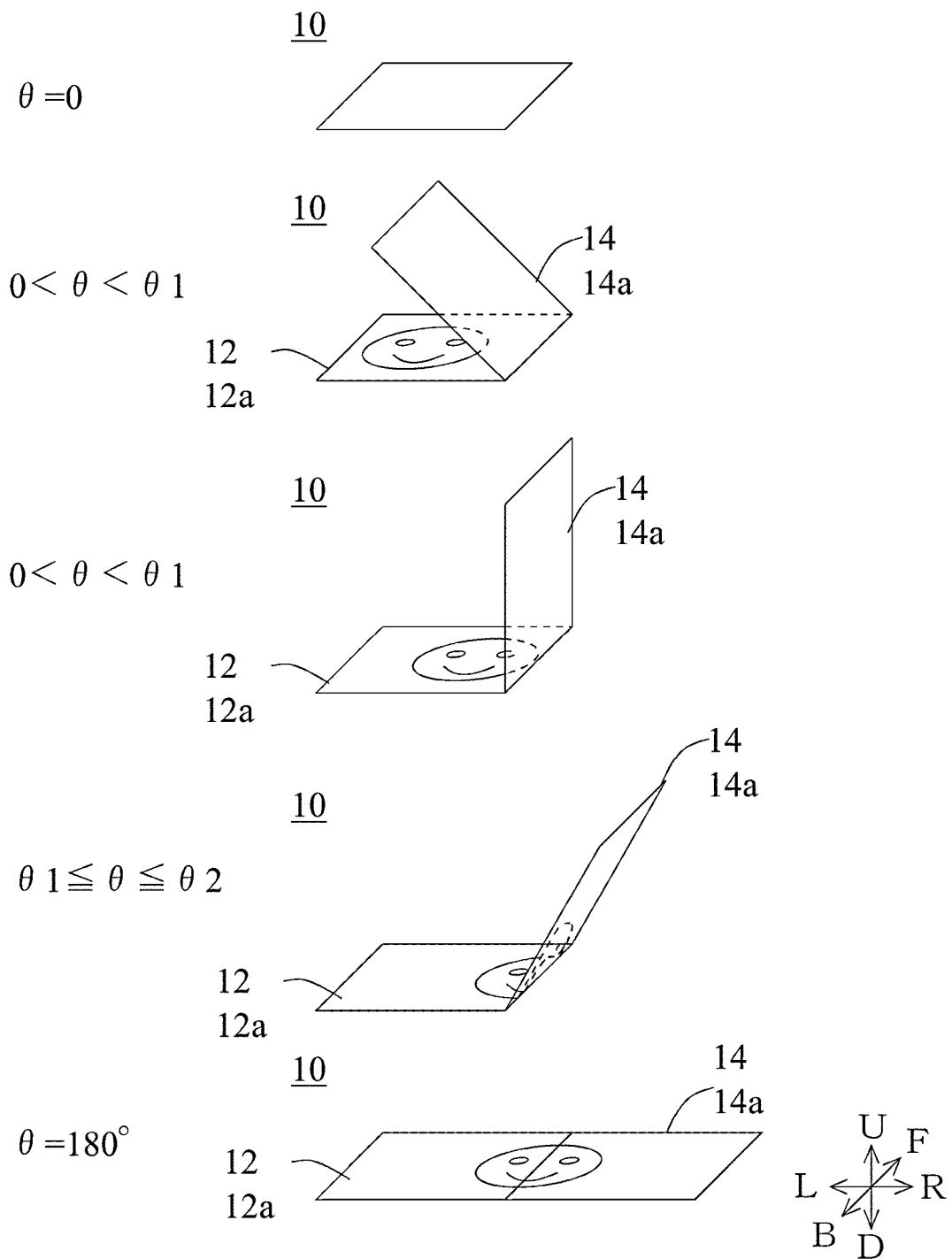
FIG. 4 is a view illustrating a video to be displayed when a state of the electronic device 10 is switched from a fully closed state to a fully open state according to an exemplary embodiment.
Figure 5:
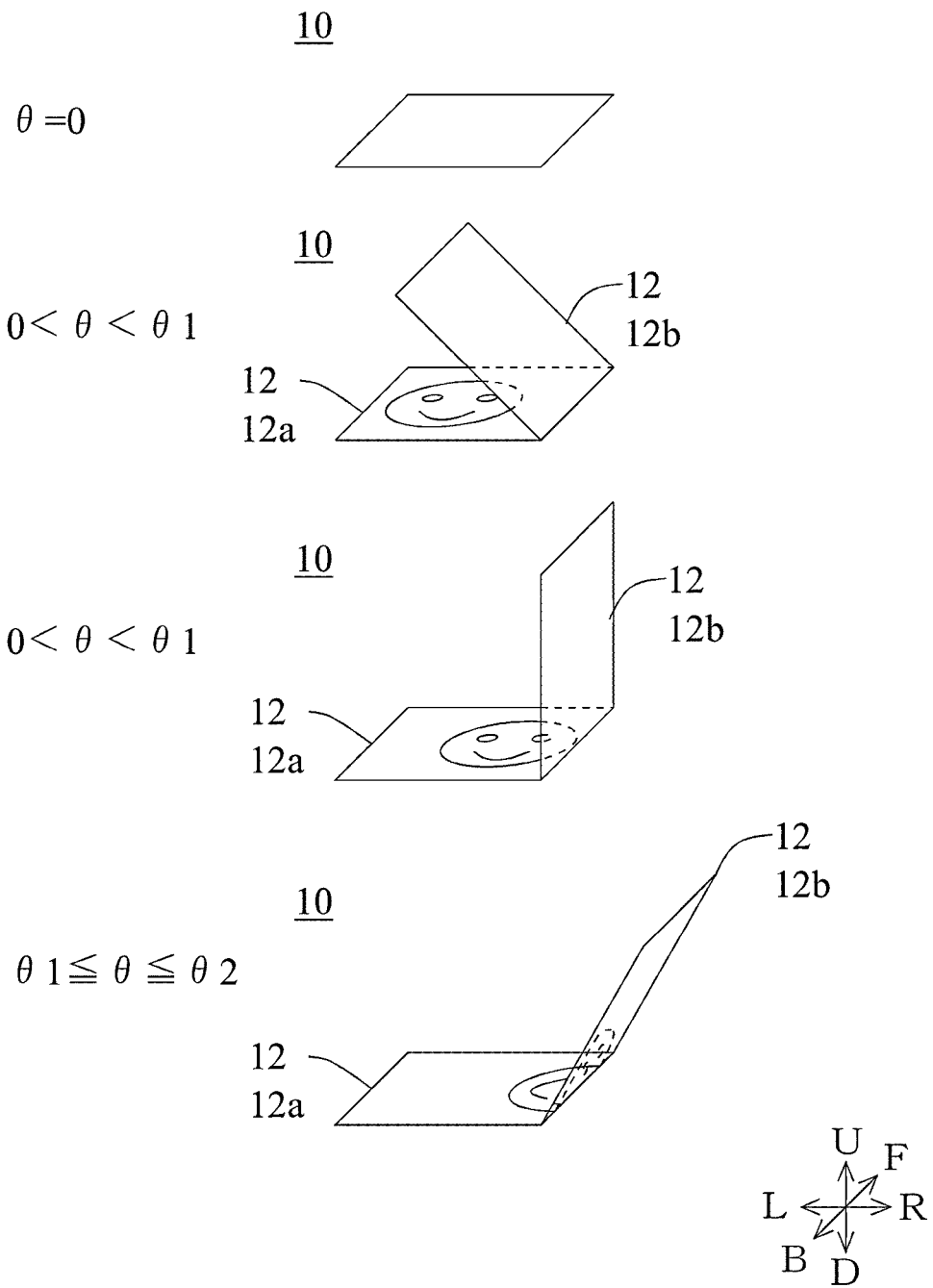
FIG. 5 is a view illustrating a video to be displayed when the state of the electronic device 10 is switched from the fully closed state to an intermediate state according to an exemplary embodiment.

Operation of the electronic device 10 will be described below with reference to the drawings. FIG. 3 is a view illustrating a video to be displayed when a state of an electronic device 1010 in related art is switched from a fully closed state to a fully open state. FIG. 4 is a view illustrating a video to be displayed when a state of the electronic device 10 is switched from the fully closed state to the fully open state. FIG. 5 is a view illustrating a video to be displayed when the state of the electronic device 10 is switched from the fully closed state to an intermediate state. The intermediate state is a state in which the angle θ is within a predetermined range in the electronic device 10. In other words, the intermediate state is a state in which θ1≤θ≤θ2 is satisfied in the electronic device 10. Note that θ1 is, for example, 100°. 02 is, for example, 140°. Hereinafter, operation in which the state of the electronic device 10 is switched from the fully closed state to the intermediate state is defined as intermediate operation. Operation in which the state of the electronic device 10 is switched from the fully closed state to the fully open state is defined as a fully opening operation.

In the electronic device 1010, when the user rotates a second display unit 1014 with respect to a first display unit 1012, a control unit determines whether a horizontal direction of the video to be displayed on a first display 1012a and a second display 1014a is made to match the front-rear direction or the left-right direction based on the angle θ acquired by an angle acquisition unit 1020. Specifically, as illustrated in FIG. 3, when 0<θ<θ1, the control unit makes the horizontal direction of the video match the left-right direction. When θ1≤θ≤θ2 (that is, in the intermediate state), the control unit makes the horizontal direction of the video match the front-rear direction. When $\theta2<\theta$, the control unit makes the horizontal direction of the video match the left-right direction.

When $\theta1<\theta<\theta2$ (that is, in the intermediate state), the user often looks at the first display 1012a and the second display 1014a toward right direction. Thus, the control unit makes the horizontal direction of the video match the front-rear direction. On the other hand, when $\theta=180°$ (that is, in the fully open state), the user often looks at the first display 1012a and the second display 1014a in a forward direction (e.g., concurrently and collectively). Thus, the control unit 18 makes the horizontal direction of the video match the left-right direction.

However, in the fully opening operation illustrated in FIG. 3, the orientation of the video changes unnecessarily. Specifically, in the fully opening operation illustrated in FIG. 3, the control unit does not need to make the horizontal direction of the video match the front-rear direction when $\theta1\leq\theta\leq\theta2$.

Thus, in the electronic device 10, in the fully opening operation illustrated in FIG. 4, when $\theta1<\theta<\theta2$, the control unit 18 does not make the horizontal direction of the video match the front-rear direction, but makes the horizontal direction of the video match the left-right direction. Specifically, when $0<\theta<\theta1$, the control unit 18 makes the horizontal direction of the video match the left-right direction. When $\theta1\leq\theta\leq\theta2$ (that is, in the intermediate state), the control unit 18 makes the horizontal direction of the video match the left-right direction. When $\theta2<\theta$, the control unit 18 makes the horizontal direction of the video match the left-right direction.

On the other hand, in the electronic device 10, in the intermediate operation illustrated in FIG. 5, the control unit 18 makes the horizontal direction of the video match the front-rear direction when $\theta1\leq\theta<\theta2$. Specifically, when $0<\theta<\theta1$, the control unit 18 makes the horizontal direction of the video match the left-right direction. When $\theta1\leq\theta\leq\theta2$ (that is, in the intermediate state), the control unit 18 makes the horizontal direction of the video match the front-rear direction.

Figure 6:
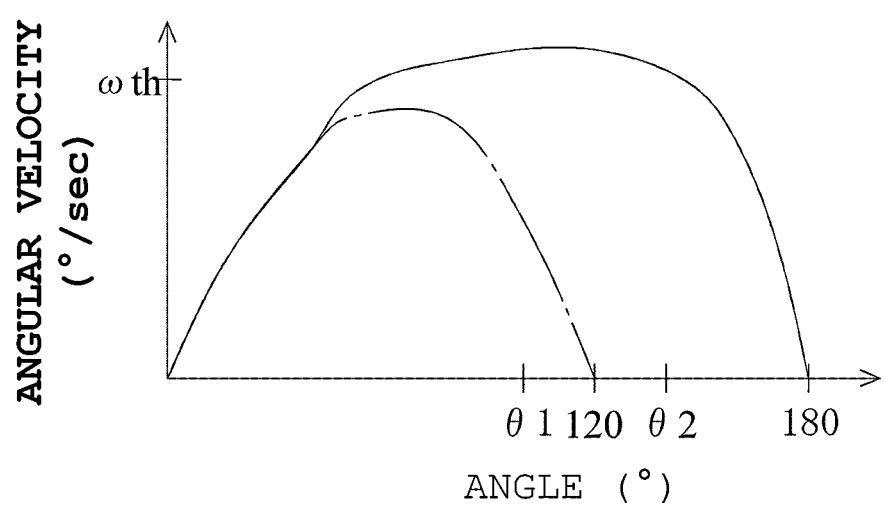
FIG. 6 is a graph indicating a relationship between an angle θ and angular velocity ω in fully opening operation and in intermediate operation.

In order to achieve the control as described above, the control unit 18 uses the angle $\theta$ and the angular velocity $\omega$ as will be described below. In particular, FIG. 6 is a graph indicating a relationship between the angle $\theta$ and the angular velocity $\omega$ in the fully opening operation and in the intermediate operation. The horizontal axis represents an angle, and the vertical axis represents angular velocity. In FIG. 6, a solid line indicates a relationship between the angle $\theta$ and the angular velocity $\omega$ in the fully opening operation. In FIG. 6, an alternate long and short dash line indicates a relationship between the angle $\theta$ and the angular velocity $\omega$ in the intermediate operation.

In the fully opening operation, $\omega>\omega\text{th}$ holds when $\theta1\leq\theta\leq\theta2$. On the other hand, in the intermediate operation, $\omega\leq\omega\text{th}$ holds when $\theta1\leq\theta<\theta2$. As described above, the control unit 18 can identify the fully opening operation and the intermediate operation based on the angle $\theta$ and the angular velocity $\omega$. It is noted that $\omega\text{th}$ is, for example, 300°/sec.

Thus, in a case where $\theta1\leq\theta\leq\theta2$ and $0<\omega<\omega\text{th}$, the control unit 18 makes the horizontal direction of the video match the front-rear direction. Further, in a case where $\theta1\leq\theta\leq\theta2$ is not satisfied or $0<\omega<\omega\text{th}$ is not satisfied, the control unit 18 makes the horizontal direction of the video match the left-right direction.

Figure 7:
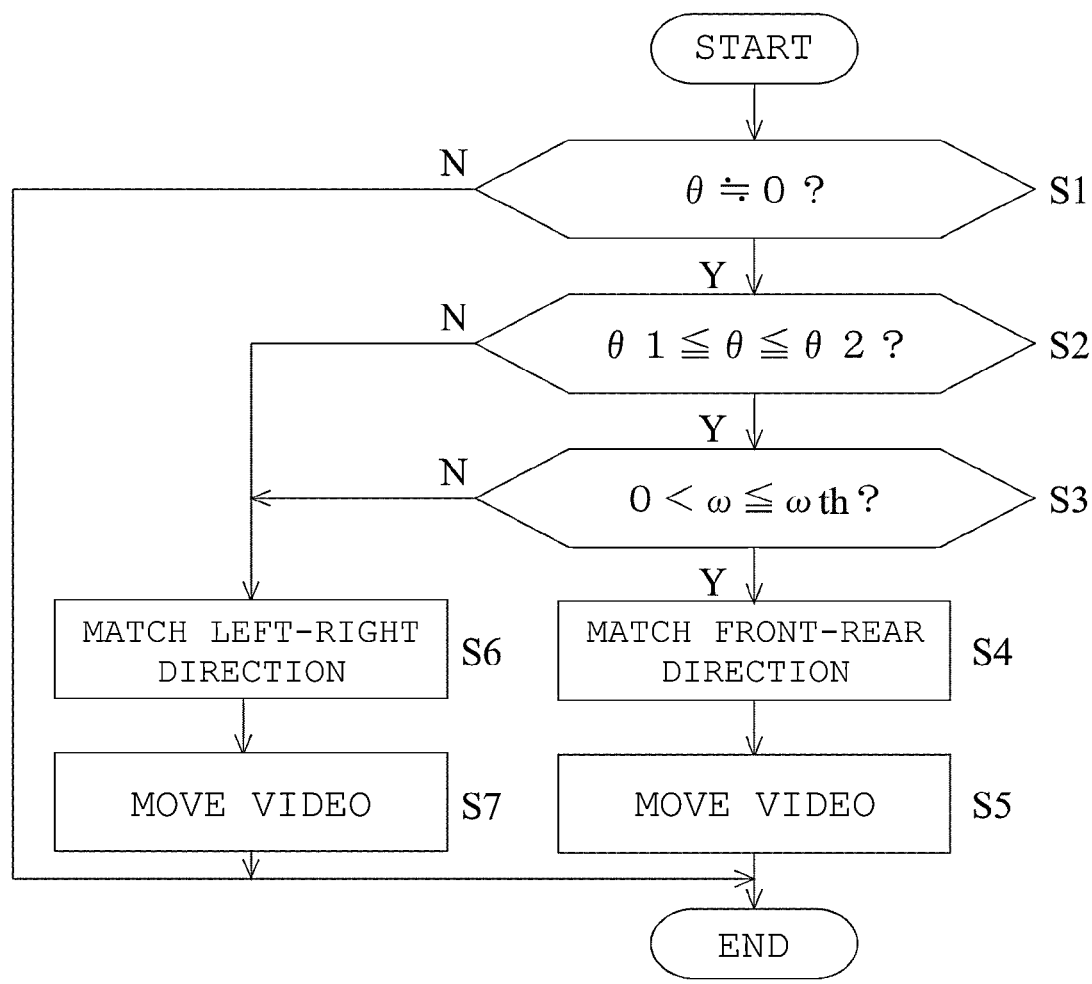
FIG. 7 is a flowchart illustrating processing to be performed by a control unit 18 of the exemplary embodiment.

Next, an example of operation to be performed by the control unit 18 will be described with reference to the drawings. In particular, FIG. 7 is a flowchart illustrating processing to be performed by the control unit 18 according to an exemplary embodiment. The flowchart of FIG. 7 is performed by the control unit 18 (e.g., a processor) executing a program stored in a storage unit (not illustrated).

First, the control unit 18 determines whether or not $\theta\approx0°$ (step S1). That is, in step S1, the control unit 18 determines whether the electronic device 10 is in a fully closed state. In a case where $\theta\approx0°$, the control unit 18 determines that the electronic device 10 is in the fully closed state. Thus, the processing proceeds to step S2. In a case where $\theta\approx0°$ is not satisfied, the control unit 18 determines that the electronic device 10 is not in the fully closed state. Thus, this processing ends.

In a case where $\theta\approx0°$, the control unit 18 determines whether or not $\theta1\leq\theta\geq\theta2$ is satisfied (step S2). When $\theta1\leq\theta\leq\theta2$, the processing proceeds to step S3. As also shown, when $\theta1\leq\theta\leq\theta2$ is not satisfied, the processing proceeds to step S6.

In a case where $\theta1\leq\theta\leq\theta2$, the control unit 18 determines whether $0<\omega<\omega\text{th}$ is satisfied (step S3). In steps S2 and S3, the control unit 18 determines whether the fully opening operation or the intermediate operation is performed. In a case where $0<\omega<\omega\text{th}$, the processing proceeds to step S4. In a case where $0<\omega<\omega\text{th}$ is not satisfied, the processing proceeds to step S6.

When $0<\omega<\omega\text{th}$, the control unit 18 determines that the intermediate operation is performed. As illustrated in FIG. 5, the control unit 18 determines to make the horizontal direction of the video match the front-rear direction (step S4). Furthermore, as illustrated in FIG. 5, the control unit 18 moves the video in a right direction (step S5). In other words, in a case where the angle $\theta$ is within the predetermined range and the angular velocity $\omega$ is greater than 0 and equal to or less than the positive predetermined value, the control unit 18 moves the video in the right direction while making the horizontal direction of the video match the front-rear direction. Consequently, the video is displayed at the center of the combined display of the first display 12a and the second display 14a. Thereafter, this processing ends.

In step S6, the control unit 18 determines that the fully opening operation is performed. As illustrated in FIG. 4, the control unit 18 is configured to determine to make the horizontal direction of the video match the left-right direction (step S6). Furthermore, as illustrated in FIG. 4, the control unit 18 moves the video in the right direction (step S7). In other words, when the angle $\theta$ is not within the predetermined range or the angular velocity $\omega$ is not greater than 0 and not equal to or less than the positive predetermined value, the control unit 18 moves the video in the right direction while making the horizontal direction of the video match the left-right direction. Consequently, the video is displayed at the center of the combined display of the first display 12a and the second display 14a. Thereafter, this processing ends.

According to the exemplary embodiment of the electronic device 10 including the foldable first display 12a and the foldable second display 14a configured as above, a video can be displayed on the electronic device 10 having an orientation suitable for a use scene. More specifically, when the user rotates the second display unit 14 with respect to the first display unit 12, the control unit 18 determines whether the horizontal direction of the video to be displayed on the first display 12a and the second display 14a is made to match the vertical direction or the left-right direction based on the angle $\theta$ and the angular velocity $\omega$ acquired by the angle and angular velocity acquisition unit 20. As a result, the control unit 18 can identify the intermediate operation and the fully opening operation. Thus, the control unit 18 can cause the first display 12a and the second display 14a to display a video having an orientation suitable for the intermediate operation and can cause the first display 12a and the second display 14a to display a video having an orientation suitable for the fully opening operation. As described above, according to the electronic device 10 including the foldable first display 12a and the foldable second display 14a, a video can be displayed having an orientation suitable for a use scene.

According to the electronic device 10 including the foldable first display 12a and the foldable second display 14a, it is possible to display a video having an orientation suitable for a use scene more accurately. More specifically, in the fully opening operation, $\omega > \omega th$ holds when $\theta 1 < \theta < \theta 2$. On the other hand, in the intermediate operation, $\omega < \omega th$ holds when $\theta 1 \le \theta < \theta 2$. In this manner, the control unit 18 can identify the fully opening operation and the intermediate operation based on the angular velocity $\omega$ when $\theta 1 \le \theta < \theta 2$.

Thus, when the angle $\theta$ is within the predetermined range and the angular velocity $\omega$ is greater than 0 and equal to or less than the positive predetermined value (that is, in a case where $\theta 1 \le \theta \le \theta 2$ and $0 < \omega \le \omega th$), the control unit 18 is configured to make the horizontal direction of the video match the front-rear direction. Furthermore, when the angle $\theta$ is not within the predetermined range or the angular velocity $\omega$ is not greater than 0 and not equal to or less than the positive predetermined value (that is, in a case where $\theta 1 \le \theta \le \theta 2$ is not satisfied or $0 < \omega \le \omega th$ is not satisfied), the control unit 18 is configured to make the horizontal direction of the video match the left-right direction. As a result, the control unit 18 can more accurately identify the fully opening operation and the intermediate operation. Accordingly, the electronic device 10 including the foldable first display 12a and the foldable second display 14a is configured to display a video having an orientation suitable for a use scene more accurately.

According to the electronic device 10 including the foldable first display 12a and the foldable second display 14a, a video can be displayed having an orientation suitable for a use scene more accurately. More specifically, when the angle $\theta$ is within the predetermined range and the angular velocity $\omega$ is greater than 0 and equal to or less than the positive predetermined value (that is, in a case where $\theta 1 \le \theta \le \theta 2$ and $0 < \omega \le \omega th$), the control unit 18 moves the video in the right direction while making the horizontal direction of the video match the front-rear direction. Consequently, the video is displayed at the center of the combined display of the first display 12a and the second display 14a. As a result, according to the electronic device 10 including the foldable first display 12a and the foldable second display 14a, a video can be displayed having an orientation suitable for a use scene more accurately. Furthermore, when the angle $\theta$ is not within the predetermined range or the angular velocity $\omega$ is not greater than 0 and not equal to or less than the positive predetermined value (that is, in a case where $\theta 1 \le \theta \le \theta 2$ is not satisfied or $0 < \omega \le \omega th$ is not satisfied), the control unit 18 moves the video in the right direction while making the horizontal direction of the video match the left-right direction. Consequently, the video is displayed at the center of the combined display of the first display 12a and the second display 14a. As a result, according to the electronic device 10 including the foldable first display 12a and the foldable second display 14a, a video can be displayed having an orientation suitable for a use scene more accurately.

(First Modification)

Figure 8:
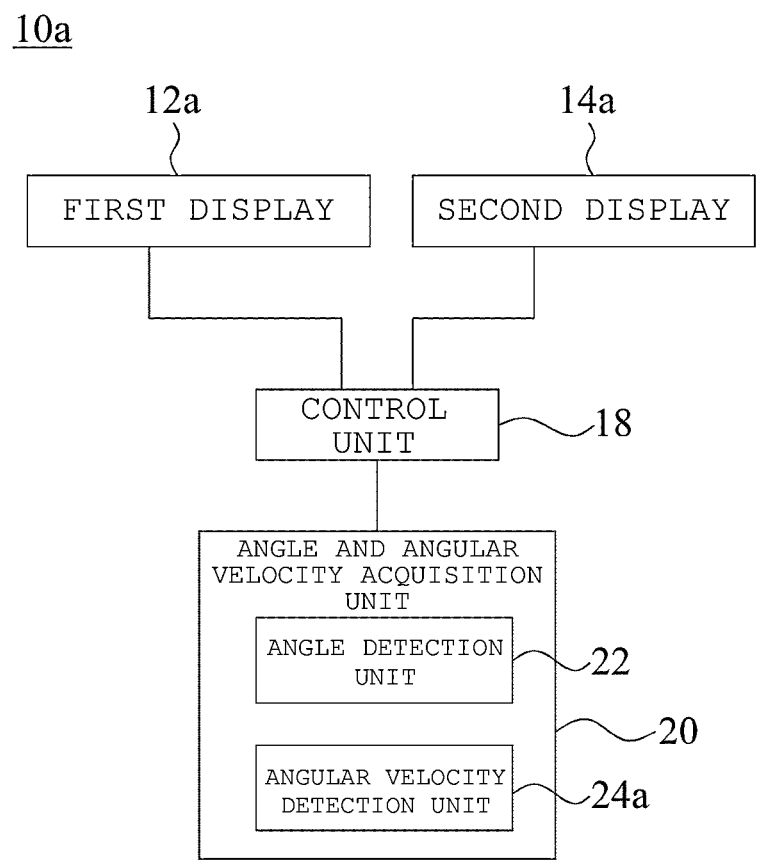
FIG. 8 is a block diagram of an electronic device 10a according to a first modification of the exemplary embodiment.

An electronic device 10a according to a first modification of the exemplary embodiment will be described below with reference to the drawings. FIG. 8 is a block diagram of the electronic device 10a according to the first modification.

The electronic device 10a is different from the electronic device 10 in that an angular velocity detection unit 24a is provided instead of the angular velocity calculation unit 24. Thus, the angle and angular velocity acquisition unit 20 includes the angle detection unit 22 that detects the angle $\theta$ and the angular velocity detection unit 24a that detects the angular velocity $\omega$. The angular velocity detection unit 24a is implemented by, for example, a combination of a sensor for detecting the angular velocity $\omega$ and a CPU. Other components of the electronic device 10a are the same as those of the electronic device 10, and thus, description thereof will be omitted. The sensor for detecting the angular velocity $\omega$ is, for example, an acceleration sensor or a piezoelectric sensor.

(Second Modification)

Figure 9:
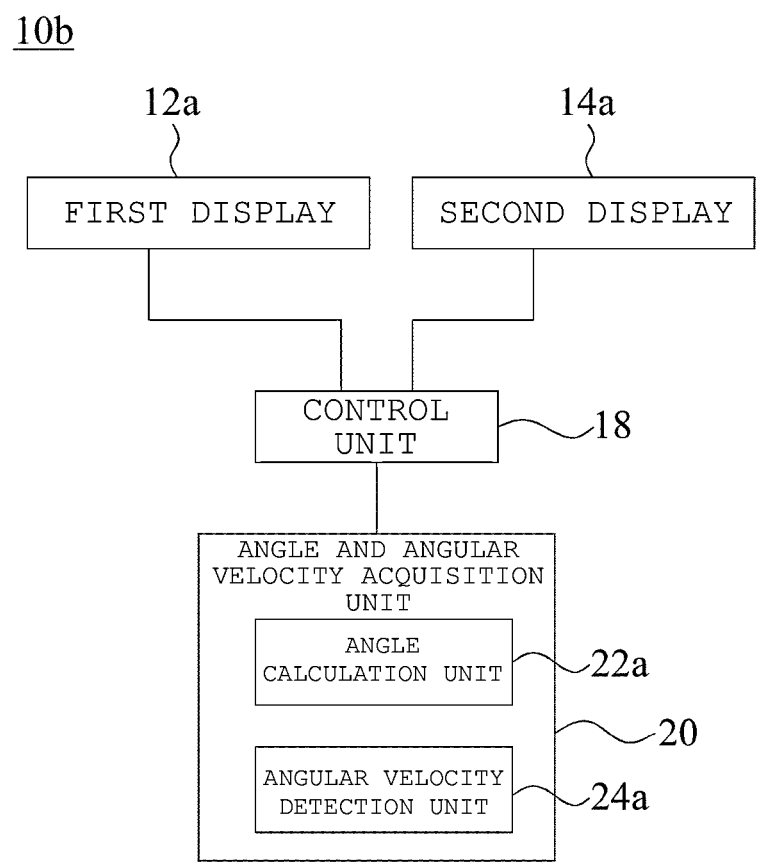
FIG. 9 is a block diagram of an electronic device 10b according to a second modification of the exemplary embodiment.

An electronic device 10b according to a second modification of the exemplary embodiment will be described below with reference to the drawings. FIG. 9 is a block diagram of the electronic device 10b according to the second modification.

The electronic device 10b is different from the electronic device 10 in that an angle calculation unit 22a is provided instead of the angle detection unit 22. The angle and angular velocity acquisition unit 20 includes the angular velocity detection unit 24a that detects the angular velocity $\omega$ and the angle calculation unit 22a that calculates the angle $\theta$ based on the angular velocity $\omega$. The angle calculation unit 22a calculates the angle $\theta$ by integrating the angular velocity $\omega$ with time. The angle calculation unit 22a is implemented by, for example, a CPU. Other components of the electronic device 10b are the same as those of the electronic device 10, and thus, description thereof will be omitted.

According to the electronic device 10b, the electronic device 10b can be made smaller. More specifically, the angle and angular velocity acquisition unit 20 includes the angular velocity detection unit 24a that detects the angular velocity $\omega$ and the angle calculation unit 22a that calculates the angle $\theta$ based on the angular velocity $\omega$. This eliminates the need for the electronic device 10 to include the sensor corresponding to the angle calculation unit 22a. As a result, the electronic device 10b can be made smaller.

Additional Exemplary Embodiments

It is generally noted that the electronic device according to the present invention is not limited to the electronic devices 10, 10a, and 10b and can be modified within the scope of the gist thereof. For example, it is also noted that the configurations of the electronic devices 10, 10a, and 10b may be combined.

In the electronic devices 10, 10a, and 10b, a piezoelectric sensor provided at the touch sensor 16 may be used as a sensor of the angle detection unit 22 or the angular velocity detection unit 24a according to exemplary aspects. The piezoelectric sensor includes a film of an organic material such as PLLA or PVDF as a piezoelectric body. This eliminates the need for addition of a new sensor in the electronic devices 10, 10a, and 10b. As a result, the electronic devices 10, 10a, and 10b can be made thinner.

It is also noted that the first display 12a and the second display 14a does not have to be one flexible display. For example, the first display 12a and the second display 14a may be two displays independent of each other.

Yet further, it is noted that in the electronic devices 10, 10a, and 10b, the processing in steps S5 and S7 in FIG. 7 is not essential.

It is noted that in the electronic devices 10, 10a, and 10b, the processing of determining whether the control unit 18 performs the intermediate operation or the fully opening operation is not limited to the processing described in steps S2 and S3. The control unit 18 may determine whether the intermediate operation or the fully opening operation is performed based on the angle θ and the angular velocity ω acquired by the angle and angular velocity acquisition unit 20.

In the electronic devices 10, 10a, and 10b, the touch sensor 16 is not essential. Further, the touch sensor 16 may be provided only on one of the first display 12a and the second display 14a.

It is further noted that in the electronic devices 10, 10a, and 10b, the first display 12a and the second display 14a are one flexible display, and thus, the second display unit 14 can rotate with respect to the first display unit 12. In other words, when the first display 12a and the second display 14a are bent, the second display unit 14 can rotate with respect to the first display unit 12. However, the first display unit 12 and the second display unit 14 may be connected by a hinge so that the second display unit 14 can rotate with respect to the first display unit 12.

DESCRIPTION OF REFERENCE SYMBOLS 10, 10a, 10b: Electronic device
12: First display unit
12a: First display
12b: First display unit main body
14: Second display unit
14a: Second display
14b: Second display unit main body
16: Touch sensor
18: Control unit
20: Angle and angular velocity acquisition unit
22: Angle detection unit
22a: Angle calculation unit
24: Angular velocity calculation unit
24a: Angular velocity detection unit
L: Folding line
θ: Angle
ω: Angular velocity

The invention claimed is:

1. An electronic device comprising:
a first display unit including a first display;
a second display unit including a second display disposed on a side of the first display with the second display unit being rotatable relative to the first display unit about a rotation axis that extends in a front-rear direction such that an angle between the first display and the second display changes as the second display unit is rotated about the rotation axis;
an angle and angular velocity acquisition unit configured to acquire the angle between the first display and the second display and an angular velocity of the angle; and
a control unit configured to determine, as the second display unit rotates about the rotation axis, whether to match a horizontal direction of a video to be displayed on the first and second displays to a vertical direction or a left-right direction based on the angle acquired by the angle and angular velocity acquisition unit and whether the angular velocity is above or below a positive predetermined value,
wherein the control unit is further configured to make the horizontal direction of the video match the left-right direction when the angle is not within a predetermined range or the angular velocity is not greater than 0 and not equal to or less than the positive predetermined value.

2. The electronic device according to claim 1, wherein the angle and angular velocity acquisition unit includes an angle detection unit that is configured to detect the angle and an angular velocity detection unit that is configured to detect the angular velocity.

3. The electronic device according to claim 1, wherein the angle and angular velocity acquisition unit includes an angle detection unit that is configured to detect the angle and an angular velocity calculation unit that is configured to calculate the angular velocity based on the angle.

4. The electronic device according to claim 1, wherein the angle and angular velocity acquisition unit includes an angular velocity detection unit that is configured to detect the angular velocity and an angle calculation unit that is configured to calculate the angle based on the angular velocity.

5. The electronic device according to claim 1, wherein the first display and the second display comprise a single flexible display.

6. The electronic device according to claim 1, wherein the angle and angular velocity acquisition unit comprises a piezoelectric sensor configured to acquire the angle between the first display and the second display and the angular velocity of the angle.

7. The electronic device according to claim 1, wherein the angle and angular velocity acquisition unit comprises a CPU and at least one of a rotary encoder, a strain sensor and a piezoelectric film sensor.

8. The electronic device according to claim 1, wherein the control unit comprises a processor configured to execute a program stored in a storage unit for determining whether to match the horizontal direction of the video to the vertical direction or the left-right direction based on the angle and the angular velocity.

9. An electronic device comprising:
a first display unit including a first display;
a second display unit including a second display disposed on a side of the first display with the second display unit being rotatable relative to the first display unit about a rotation axis that extends in a front-rear direction such that an angle between the first display and the second display changes as the second display unit is rotated about the rotation axis;
an angle and angular velocity acquisition unit configured to acquire the angle between the first display and the second display and an angular velocity of the angle; and
a control unit configured to determine, as the second display unit rotates about the rotation axis, whether to match a horizontal direction of a video to be displayed on the first and second displays to a vertical direction or a left-right direction based on the angle and the angular velocity acquired by the angle and angular velocity acquisition unit,
wherein the control unit is configured to make the horizontal direction of the video match a front-rear direction when the angle is within a predetermined range and the angular velocity is greater than 0 and equal to or less than a positive predetermined value.

10. The electronic device according to claim 9, wherein, when the angle is within the predetermined range and the angular velocity is greater than 0 and equal to or less than the positive predetermined value, the control unit is configured to move the video in a side direction towards the second display while making the horizontal direction of the video match the front-rear direction.

11. The electronic device according to claim 9, wherein the control unit is configured to make the horizontal direction of the video match the left-right direction when the angle is not within the predetermined range or the angular velocity is not greater than 0 and not equal to or less than the positive predetermined value.

12. The electronic device according to claim 11, wherein, when the angle is not within the predetermined range or the angular velocity is not greater than 0 and not equal to or less than the positive predetermined value, the control unit is configured to move the video in a direction towards the second display while making the horizontal direction of the video match the left-right direction.

13. An electronic device comprising:
a first display unit including a first display;
a second display unit including a second display coupled to the first display and rotatable about a rotation axis relative to the first display unit, such that an angle between the first display and the second display changes as the second display unit is rotated about the rotation axis;
an angle and angular velocity acquisition unit configured to acquire the angle between the first display and the second display and an angular velocity of the angle; and
a control unit configured to dynamically determine, based on the angle and the angular velocity acquired by the angle and angular velocity acquisition unit, whether to control a display orientation of a video to be displayed on the first and second displays in a first direction extending in a thickness direction of the electronic device or to control the display orientation to be in a second direction orthogonal to the first direction as the second display unit rotates about the rotation axis and whether the angular velocity is above or below a positive predetermined value.

14. The electronic device according to claim 13, wherein the control unit is configured to make the display orientation of the video match the second direction when the angle is within a predetermined range and the angular velocity is greater than 0 and equal to or less than a positive predetermined value.

15. The electronic device according to claim 14, wherein, when the angle is within the predetermined range and the angular velocity is greater than 0 and equal to or less than the positive predetermined value, the control unit is configured to move the video in the second direction towards the second display while making the display orientation of the video match the second direction.

16. The electronic device according to claim 13, wherein the control unit is configured to make the display orientation of the video match the second direction when the angle is not within the predetermined range or the angular velocity is not greater than 0 and not equal to or less than the positive predetermined value.

17. The electronic device according to claim 16, wherein, when the angle is not within the predetermined range or the angular velocity is not greater than 0 and not equal to or less than the positive predetermined value, the control unit is configured to move the video in the second direction towards the second display while making the display orientation of the video match the second direction.

18. The electronic device according to claim 13, wherein the first display and the second display comprise a single flexible display.

19. The electronic device according to claim 13, wherein the angle and angular velocity acquisition unit comprises a CPU and at least one of a rotary encoder, a strain sensor and a piezoelectric film sensor.

20. The electronic device according to claim 13, wherein the control unit comprises a processor configured to execute a program stored in a storage unit for determining whether to match the display orientation of the video to the first direction or the second direction based on the angle and the angular velocity.

* * * * *